United States Patent
Khalil et al.

(10) Patent No.: US 9,787,678 B2
(45) Date of Patent: Oct. 10, 2017

(54) MULTIFACTOR AUTHENTICATION FOR MAIL SERVER ACCESS

(71) Applicant: Verizon Patent and Licensing Inc., Arlington, VA (US)

(72) Inventors: Manah M. Khalil, Coppell, TX (US); Vijaya R. Challa, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 83 days.

(21) Appl. No.: 14/813,532

(22) Filed: Jul. 30, 2015

(65) Prior Publication Data

US 2017/0034164 A1    Feb. 2, 2017

(51) Int. Cl.
   *G06F 7/04*   (2006.01)
   *H04L 29/06*  (2006.01)
   *H04L 12/58*  (2006.01)

(52) U.S. Cl.
   CPC .......... *H04L 63/0876* (2013.01); *H04L 51/20* (2013.01); *H04L 63/0884* (2013.01)

(58) Field of Classification Search
   CPC .. H04L 63/0876; H04L 51/20; H04L 63/0884
   See application file for complete search history.

(56) References Cited

U.S. PATENT DOCUMENTS

2009/0241175 A1*  9/2009  Trandal ............... G06F 21/42
                                                    726/7
2012/0117632 A1*  5/2012  Curtis .............. G11B 20/10527
                                                    726/7
2014/0068726 A1*  3/2014  Jakobsson ............ G06F 21/31
                                                    726/5
2014/0331297 A1* 11/2014  Innes .................. H04L 63/08
                                                    726/7
2014/0355523 A1* 12/2014  Congdon ............. H04W 48/12
                                                    370/328

(Continued)

OTHER PUBLICATIONS

Apostolos Malatras et al., "Mobile Botnets Taxonomy and Challenges," 2015 European Intelligence and Security Informatics Conference, 2015 IEEE computer society, pp. 149-152.*

(Continued)

*Primary Examiner* — Luu Pham
*Assistant Examiner* — Canh Le

(57) ABSTRACT

A proxy device intercepts requests from client devices to access message data through a message data device, such as accessing e-mail messages through a mail server implementing post office protocol (POP) or other messaging protocol. The proxy device determines to authenticate of a client device when, for example, the client device, is located within certain areas that differ from a geographic region associated with a message account holder. Authentication of the client device may include collecting additional information, such as a universal identifier that may be used by the client device to access various services. The proxy device may further forward a notification message to the client device indicating the access to the message data is pending until the client device is authenticated. If the client device is successfully authenticated, the proxy device forwards the request to the message data device to enable the client device to access the message data.

14 Claims, 7 Drawing Sheets

(56) References Cited

U.S. PATENT DOCUMENTS

2015/0121464 A1* 4/2015 Hughes, Jr. .......... H04L 63/105
 726/4
2015/0326556 A1* 11/2015 Vadura ................ H04L 63/0815
 726/4

OTHER PUBLICATIONS

Eisuke Ito et al. "Implementation and Operation of the Kyushu Uninversity Authentiation System," ACM 2013, pp. 137-142.*

* cited by examiner

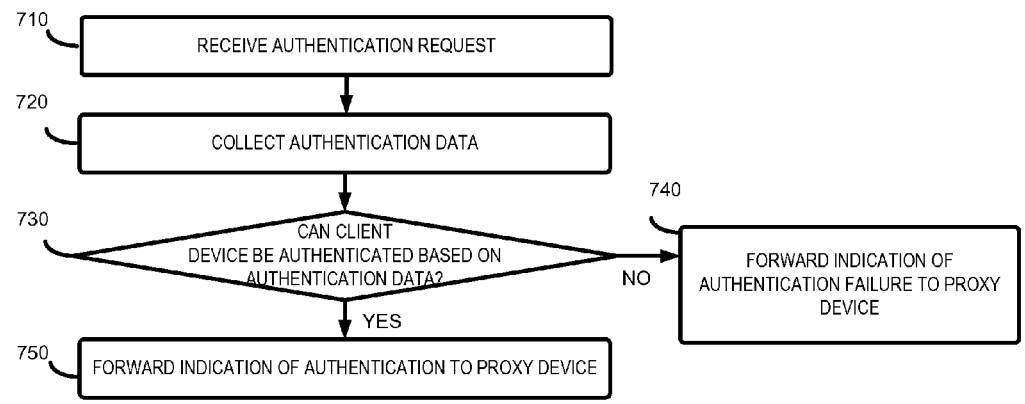

US 9,787,678 B2

MULTIFACTOR AUTHENTICATION FOR MAIL SERVER ACCESS

BACKGROUND INFORMATION

Various protocols may be used to enable a client device to access and retrieve e-mail or other message data from a remote server. For example, post office protocol (POP), currently in version 3 known as "POP3" and as defined in Internet Engineering Task Force (IETF) Request for Comments (RFC) 1939, and internet message access protocol (IMAP), currently in version 4 revision 1 (IMAP4rev1) as defined in IETF RFC 3501, are application-layer Internet standard protocols that may be used by an e-mail client application to retrieve e-mail messages and related data from a remote mail server. In general, these e-mail protocols are designed to be simple, to enable efficient access and retrieval of the e-mail data to minimize server-side processing and bandwidth usage. However, the simplicity of the e-mail protocols may raise potential security concerns. For example, these e-mail protocols typically do not include provisions for inspections to deter unauthorized use of passwords and account data.

BRIEF DESCRIPTION OF THE DRAWINGS

FIG. 7 shows an exemplary process for authenticating a client device in the environment of FIG. 1.

DETAILED DESCRIPTION OF PREFERRED EMBODIMENTS

The following detailed description refers to the accompanying drawings. The same reference numbers in different drawings identify the same or similar elements.

In systems and methods described herein, a proxy device receives and evaluates an e-mail access request received from a client device. Even if the request includes correct login data (e.g., a user identifier and a password), the proxy device may enforce security requirements before forwarding the request to an e-mail server. In response to the forwarded request, the email server may provide the client device with requested data.

Figure 1:
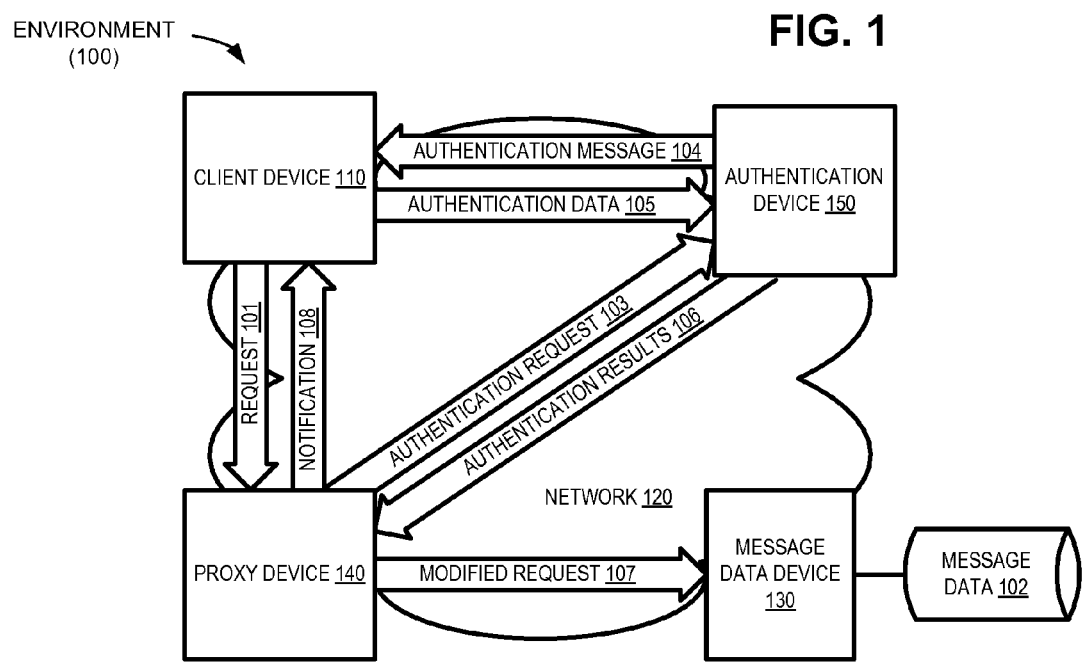
FIG. 1 is a diagram showing an exemplary environment in which the systems and methods described herein may be implemented.

FIG. 1 shows an exemplary environment 100 in which the systems and methods described herein may be implemented. As shown in FIG. 1, environment 100 may include a client device 110 to forward a request 101 via a network 120 toward a message data device 130 to request message data 102 (e.g., e-mail messages) stored or otherwise managed by message data device 130. Request 101 may be received and processed by proxy device 140. Proxy device 140 may determine whether additional authentication of request 101 is desired, and if so, proxy device 140 may forward an authentication request 103 to an authentication device 150. Authentication device 150 may send an authentication message 104 to client device 110 and may receive authentication data 105 from client device 110. Authentication device 150 may process authentication data 105 to generate and forward authentication results 106 indicating whether proxy device 130 should allow client device 110 to access message data device 130 to obtain message data 101. For example, if proxy device 140 determines (e.g., based on authentication results 106) that client device 110 is authorized to access message data device 130, proxy device 140 may modify request 101 to form a modified request 107 that is forwarded to message data device 130. Proxy device 140 may further forward a notification 108 to client device 110 indicating, for example, that client device 110 is undergoing additional evaluation before receiving access to message data 102.

Client device 110 may allow a user to access message data device 130 to obtain message data 102. Different types of client device 110 may include, for example, a personal communications system (PCS) terminal, a tablet computer, a smartphone, a personal computer, a laptop computer, a gaming console, an Internet television, a set-top box (STB), a smart TV, a digital video recorder, a media player, or another type of computational device. Client device 110 may communicate with message data device 130, proxy device 140, and/or authentication device 150 over network 120.

Network 120 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Although shown as a single element in FIG. 1, network 120 may include a number of separate networks that provide services (e.g., communication services, content-related services, etc.) to client device 110.

Message data device 130 may host software that implements Post Office Protocol version 3 (POP3), Internet Message Access Protocol version 4 revision 1 (IMAP4rev1), or another protocol for providing message data 102 to client device 110. For example, when message data device 130 receives modified request 107 from proxy device 140, message data device 130 may determine whether to permit client device 110 to access message data 102. For example, message data device 130 may determine whether modified request 107 specifies a correct account and password. If modified request 107 specifies a correct account and password, message data device 130 may forward message(s) (in message data 102) identified in modified request 107 (e.g., e-mail message that belongs to the account) to client device 110.

Proxy device 140 may determine, based on request 101, whether to forward request 101 to message data device 130 or authentication device 150. For example, proxy device 140 may forward, as modified request 107, account data (e.g., a user identifier), password, and request 101, to message data device 130 without additional evaluation by authentication device 150 provided that: client device 110 has previously accessed message data 102; client device 110 is registered with an account holder; client device 110 is located in a geographic region associated with the user account; etc. In contrast, proxy device 140 may forward request 101 to authentication device 150 if client device 110 has not been previously been allowed to access message data 102, if client device 110 is a public device (e.g., not associated with the account holder), if client device 110 is not located in a geographic region associated with the user account (e.g., the account holder is travelling internationally), etc.

In another implementation, proxy server 140 may limit access to message data server 130 based on network conditions even if request 101 includes valid credentials. For example, proxy server 140 may prevent client device 110 from accessing message data server 130 when message data device 130 receives an excessive number of requests 101, and defend against a denial-of-service (DoS) attack.

Additionally, proxy device 140 may interface directly with client device 110 and may selectively bridge communications between client device 110, message data device 130, and/or authentication device 150. In one example, proxy device 140 may selectively send a request 101 as a modified request 107. Alternatively, proxy device 140 may selectively redirect contents of request 101 to authentication device 150.

In one implementation, when proxy device 140 redirects request 101 to authentication device 150, proxy device 140 may send notification 108 to client device 110. Notification 108 may include: an explanation for why client device 110 is initially denied an access to message data device 130; instructions for interacting with authentication device 150; etc.

Authentication device 150 may determine whether client device 110 is authorized to communicate with message data device 130 to access message data 102. For example, authentication device 150 may forward authentication message 104 that directs client device 110 to provide particular data (e.g., authentication data 105) and/or to confirm that client device 110 is authorized to communicate with message data device 130. If client device 110 provides the requested data and/or confirms its authenticity, authentication device 150 may forward authentication results 106 to proxy device 140, directing proxy device 140 to allow client device 110 to access message data device 130.

In one implementation, authentication device 150 may base its authentication process on multiple factors. The factors may include, for example: 1) something the user possesses (e.g., a mobile phone); 2) something the user knows (e.g., password); 3) something that is a trait of the user (e.g., biometrics such a finger print or iris shape); 4) a Captcha challenge or other type of test to confirm a human operator; and 5) a history of previously used IP addressed (e.g., to determine whether the request is coming from a previously authenticated devices). Typically, the use of any two of the three factors may provide strong security.

In one implementation, a user's interaction with client device 110 may serve as a basis for authentication factors. For example, a user may set up an account to access message data 102. Account set-up may include, for example, creating a user identification (ID), along with a set of credentials and authentication options. These credentials include a password. In some embodiments, the user credentials can also include a factor relating to the user, such as a biometric factor.

The authentication options may encompass a question-answer scheme, in which the user may register a set of questions to be presented via client device 110 (e.g., in authentication message 104 and/or notification 108). Client device 110 be authenticated by authentication device 140 based on the user's answers to the questions.

In one implementation (described in greater detail below with respect to FIG. 2), a user may register for multiservice authentication. As part of a registration process for the multiservice authentication, the user may be authenticated by a single device (e.g., authentication device 150) to access multiple services that include accessing message data 102 via message data device 130. The services can also include network services, such as streaming multimedia or other types of file transfer, Intranet access, etc. For example, the user may register a user identifier (ID) and associated credentials that the user can use to access two or more of the services. In another example, the user may possess different user ID's as well as different credentials. For example, a user can register different sets of credentials to access different message services.

In one implementation, authentication device 150 may cause client device 110 to implement or otherwise participate in an authentication process to authenticate the user. For example, authentication device 150 may cause client device 110 to prompt the user to enter a personal identification number (PIN), a password, or any other credential information. The credential information may include, for example, one or combination of: a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other uniquely identifiable data (e.g., bearer tag identifier, etc.)

In some embodiments, client device 110 may include a biometric sensor. For example, client device 110 may include: a mechanism for performing a retina scan, facial scan, etc.; and/or a sensor for obtaining voice print, finger print, palm vein reader, etc.

According to certain embodiments, once an initial set of credentials are validated, authentication device 150 may take additional steps to complete the authentication process, such as a passphrase challenge.

Although FIG. 1 shows exemplary components of environment 100, in other implementations, environment 100 may include fewer components, different components, differently arranged components, or additional components than those depicted in FIG. 1. For example, in some implementations, proxy server 140 may perform one or more functions described as being performed by the message data device 130 and/or authentication device 150. Additionally or alternatively, one or more components of environment 100 may perform functions described as being performed by one or more other components of environment 100.

Figure 2:
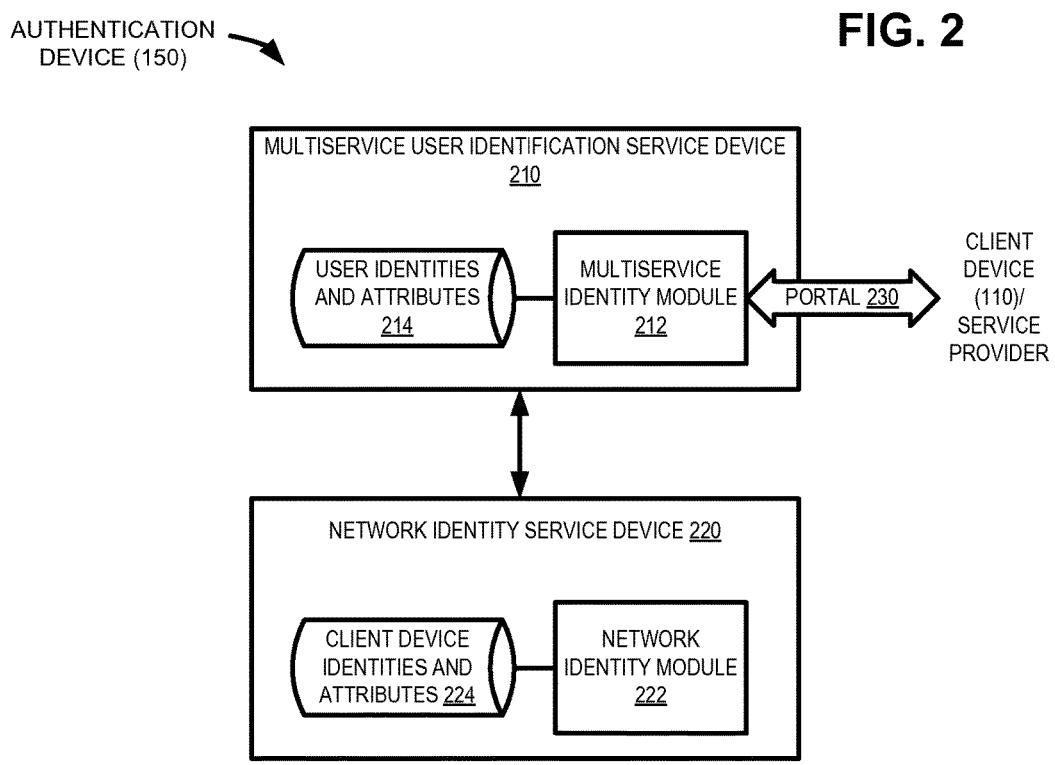
FIG. 2 is a diagram illustrating exemplary components of an authentication device that may be included in the environment of FIG. 1.

FIG. 2 is a diagram showing exemplary components of authentication device 150 according to one implementation. As shown, authentication device 150 may include a multiservice user identification service device 210 and a network identity service device 220, and may provide a multifactor authentication that includes a multiservice user identification service and network identity service. Multiservice user identification service device 210 may perform the multiservice user identification service, and network identity service device 220 may perform the network identity service.

As further shown in FIG. 2, multiservice user identification device 210 may includes a multiservice identity module 212 that generates and/or stores user identities and attributes 214. For example, multiservice identity module 212 may interact with client device 110 to obtain information, from a user, that may be used to generate a multiservice identity and related credentials that may be stored as user identities and attributes 214. Network identity device 220 may include a network identity module 222 that generates and/or stores client device identities and attributes 224. In certain situations, multiservice user identification device 210 and network identity device 220 may operate independently. For example, multiservice user identification device 210 and the network identity service may be managed by different service providers.

Multiservice identity module 212 may specify a universal identity (ID) that may be used by client device 110 to access multiple services. In certain embodiments, multiservice identity module 212 may assign client device 110 with a universal ID and a set of credentials to access the multiple services or, as previously described, may assign different combinations of identifiers and/or credentials that enable client device 110 to access different services, enable an associated user to access the services using different client devices 110, and/or different users to access the services using client device 110. Client device 110 may use the universal ID to access different services offered by different service providers.

Multiservice identity module 212 may obtain data from client device 110 (e.g., via portal 230) and may authenticate client device 110 based on the obtained data. After undergoing a successful authentication process, client device 110 may remain authenticated for a validity period determined by multiservice identity module 212. The validity period may be determined based on data received from client device 110 and/or from a service provider. Additionally or alternatively, the validity period may vary based on the different services (e.g., duration of access to multimedia content may be limited in duration based on requirements of a content provider). During the validity period, client device 110 can access multiple services by supplying the universal ID (and other information). For example, a service provider may contact multiservice identity module 212 (e.g., via portal 230) to determine whether a universal ID, provided by client device 110, is consistent with user identities and attributes data 214.

In one implementation, multiservice user identification service device 210 may operate in accordance with OpenID protocols, as described in Internet Engineering Task Force (IETF) Request for Comments (RFCs) 6749 and 6750 and/or OpenID Connect®. Multiservice identity module 212 may be accessed via portal 230 which is associated with a uniform resource identifier (URI). OpenID is a publically available, decentralized and open protocol standard for authenticating users/client devices 110. The OpenID protocols enable a user to log on to many different web sites with a single digital identity known as an OpenID Identifier. An OpenID Service enables the user to create an account, establishes a web identity (e.g., the OpenID Identifier), and registers the web identity with different services to receive various credentials. During the sign-in process, the user may be authenticated for different services using an associated OpenID Identifier (i.e., the universal ID) and related credentials.

Network identity service device 220 may authenticate client device 110, to allow client device 120 to access a network (e.g., network 120). In one example, network identity module 222 may be provided by and/or operate in coordination with a service provider that provides client device 110 with access to a portion of network 120. For example, a wireless communications company may provide wireless data services to client device 110, and network identity module may coordinate with the wireless communications company to verify a network identity related to accessing the wireless data. Network identity module may authenticate client device 110 with respect to several different service providers whose networks/devices are included in network 120.

Multiservice user identification service device 210 and network identity service device 220 may interoperate and may exchange information to perform a multifactor authentication. In one example, multiservice user identification service device 210 and network identity service device 220 may be managed by separate service providers. In another example, multiservice user identification service device 210 and network identity service device 220 may be associated with a single service provider. Depending on the implementation, multiservice user identification service device 210 and network identity service device 220 may communicate using security assertion markup language (SAML).

In one implementation, network identity module 222 may be integrated into network 120. In this implementation, network 120 may include network elements/components that are configured to authenticate client device 110 and provide access control. Thus, one or more elements of network 120 (not shown) may serve as the network identity service device 220.

As discussed above, network identity module 222 may authenticate client device 110. For example, network identity module 222 may use an extensible authentication protocol (EAP) to authenticate client device 110 to allow client device 110 access certain types of wireless networks. For example, client device 110 may be authenticated for wireless wide area networks, such as a third generation (3G) or fourth generation 4G wireless network, using EAP authentication and key agreement (EAP-AKA) techniques. In one example, network identity module 222 may authenticate client device 110 based on a service provider IP address, such that successful authentication of client device 110 by network identity module 222 enables client device 110 to engage in IP communication services.

To authenticate client device 110 (or a user at client device 110), network identity module 222 may identify client device 110. To identify client device 110, network identity module 22 may use, as "client device identity," an IP Multimedia Subsystem (IMS) private identity, media access control address (MAC address), an IP address, a username provided by the client device 110, a mobile station international subscriber directory number (msISDN), mobile identification number (MIN), an international mobile equipment identity (IMEI), electronic serial number (ESN), etc. The client device identity may be stored in client device identities and attributes 224.

Network identity module 222 may communicate with multiservice user identification service device 210. For example, network identity module 222 may enable client device 110 to access network 120 based on a universal ID via multiservice user identification service device 210.

Although FIG. 2 shows exemplary components of authentication device 150, in other implementations, authentication device 150 may include fewer components, different components, differently arranged components, or additional components than those depicted in FIG. 2. Additionally or alternatively, one or more components of authentication device 150 may perform functions described as being performed by one or more other components of authentication device 150.

Figure 3:
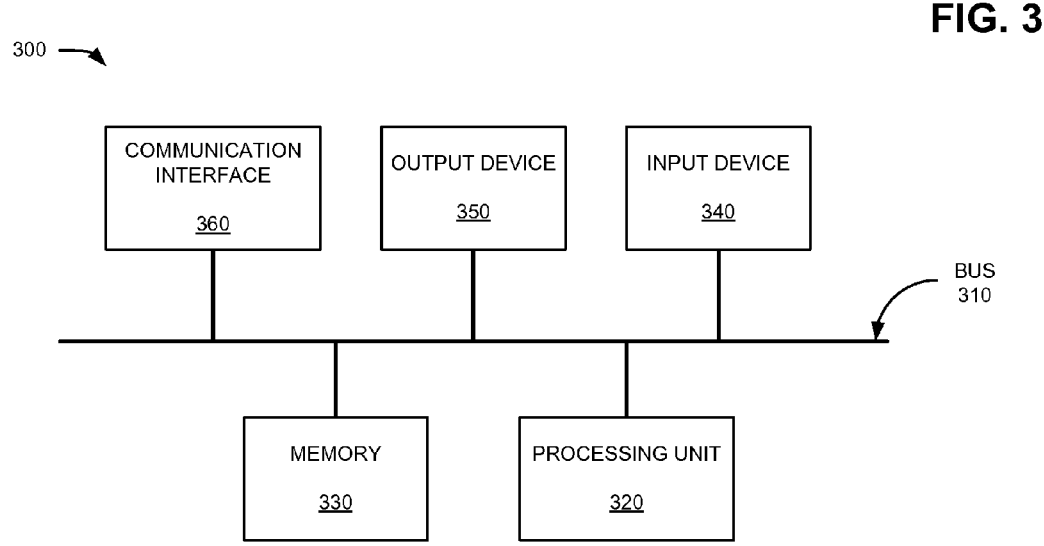
FIG. 3 is a diagram illustrating exemplary components of a computing device that may be included in the environment of FIG. 1.

FIG. 3 is a diagram illustrating exemplary functional components of a computing device 300 according to an implementation described herein. Client device 110, an element of network 120 (e.g., an access point, a node, router, switch, etc.), proxy device 140, and/or authentication device 150 may include one or more computing devices 300. As shown in FIG. 3, device 300 may include a bus 310, a processing unit 320, a memory 330, an input device 340, an output device 350, and a communication interface 360.

Bus 310 may include a path that permits communication among the components of device 300. Processing unit 320 may include any type of single-core processor, multi-core processor, microprocessor, latch-based processor, and/or processing logic (or families of processors, microprocessors, and/or processing logics) that interprets and executes instructions. In other embodiments, processing unit 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processing unit 320, and/or any type of non-volatile storage device that may store information for use by processing unit 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals.

Communication interface 360 may include and/or may be coupled to an antenna for transmitting and receiving RF signals. For example, communication interface 360 may be coupled to an antenna assembly that includes one or more antennas to transmit and/or receive RF signals. The antenna assembly may, for example, receive data from communication interface 360 and transmit RF signals associated with the data, or the antenna assembly may receive RF signals and provide them to communication interface 360 to be processed.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a Wi-Fi) card for wireless communications. Communication interface 360 may also include a universal serial bus (USB) port for communications over a cable, a Bluetooth® wireless interface, a RFID interface, a NFC wireless interface, and/or any other type of interface that converts data from one form to another form.

As will be described in detail below, device 300 may perform certain operations, and device 300 may perform these operations in response to processing unit 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processing unit 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than those depicted in FIG. 3. Additionally or alternatively, one or more components of device 300 may perform one or more tasks described as being performed by one or more other components of device 300.

Figure 4:
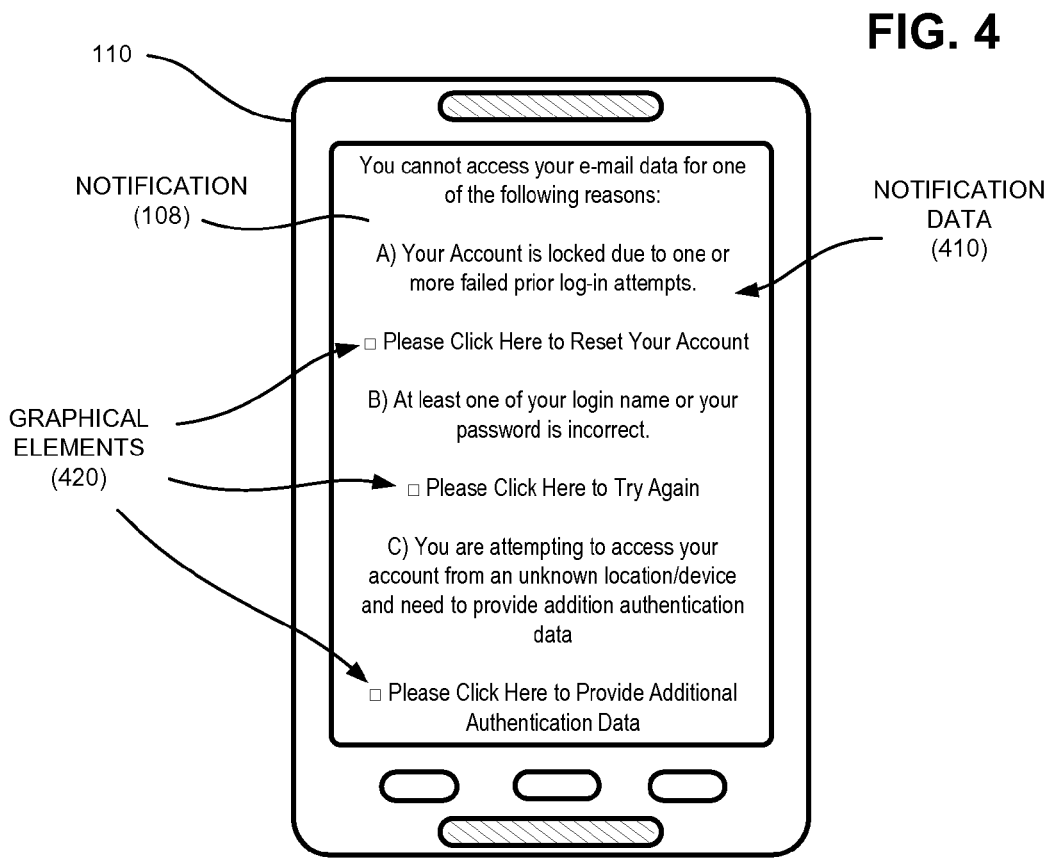
FIG. 4 shows an exemplary notification message that may be presented by a client device included in the environment of FIG. 1.

FIG. 4 shows an exemplary notification 108 that may be received from proxy device 140 and presented for display by client device 110. In POP3, client device 110 typically presents an error message when client device 110 cannot access message data 102 at message data device 130 (e.g., when proxy device 140 blocks access to message data device 130). Alternatively, client device 110 may not realize that proxy device 140 has blocked access to message data device 130 and may indicate only that that no message data 102 is available (e.g., the user had not received any messages). To prevent client device 110 from displaying the error message or indicating that no message is available when proxy device is processing client request 101, proxy device 140 may send notification 108 to client device 110, which may then display its contents to the user.

For example, proxy device 140 may dynamically generate, as notification 108, a fully compliant RFC 2822 or later email message instead of the standard access denied error code. Notification 108 may include notification data 410 that provides reasons why client device 110 is being denied access to message data 102. For example, notification 108 may indicate that an account is locked due to failed login attempts, the user has provided incorrect account or password data, and/or proxy device 140 has determined that additional steps are needed to authenticate client device 110 (e.g., client device 110 is unknown to proxy device 140 and/or is located in foreign country).

As shown in FIG. 4, notification 108 may further include graphical elements 420 that enable a user to take further action to address the reasons identified in notification data 410 which indicate that client device 110 is being denied access to message data 102. In the example shown in FIG. 4, a user may select from among graphical elements 420 related to resetting a locked account, providing a different login/password data, and/or providing additional authentication data (e.g., a universal ID) to confirm that client device 110 is being used by an authorized user.

Although FIG. 4 shows exemplary portions of notification 108, in other implementations, notification 108 may include fewer portions, different portions, additional portions, or differently arranged portions than those depicted in FIG. 4. Additionally or alternatively, one or more portions of notification 108 may include data described as being included in one or more other portions of notification 108.

Figure 5:
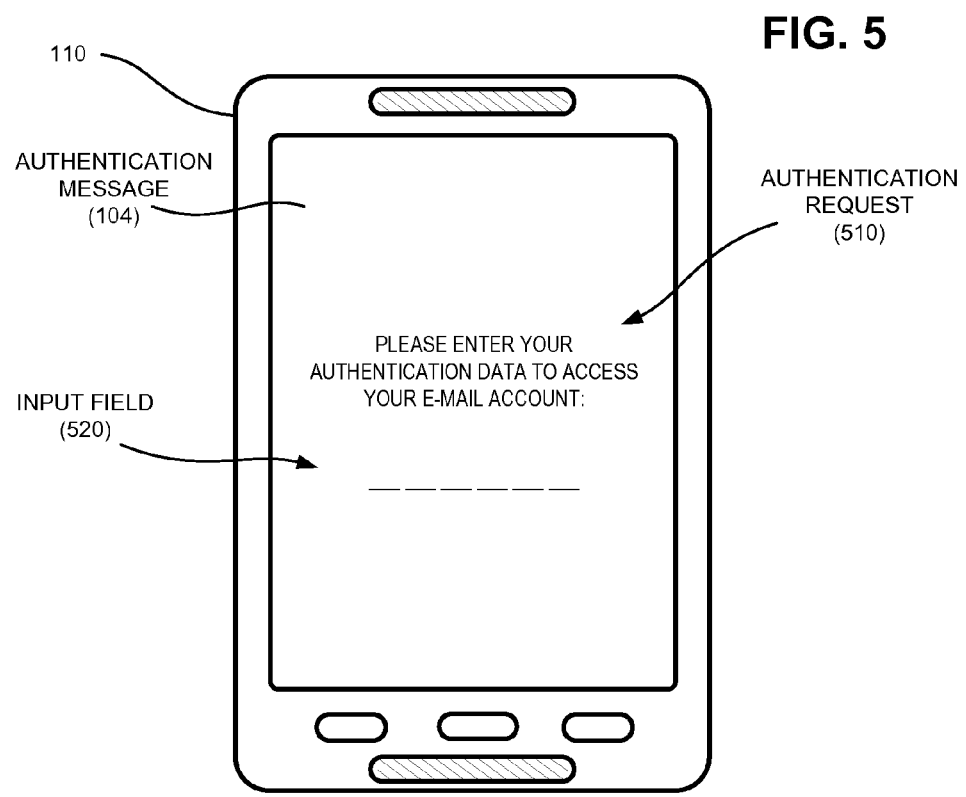
FIG. 5 shows an exemplary authentication message that may be presented by a client device included in the environment of FIG. 1.

FIG. 5 shows an exemplary authentication message 104 that may be received from authentication device 150 and presented for display by client device 110. As shown in FIG. 5, authentication message 104 may include an authentication request 510 that prompts a user to provide certain authentication data 105 and an input field 520 that enables a user to input the specific authentication data 105 identified in authentication request 510. For example, authentication request 510 may prompt the user to submit, in input field 520, a universal ID associated with client device 110. Collected authentication data 105 (e.g., data received in input field 520) may be forwarded to authentication device 150, and authentication device 150 may evaluate the authentication data 105 to determine whether to authenticate client device 110.

Although FIG. 5 shows exemplary portions of authentication message 104, in other implementations, authentication message 104 may include fewer portions, different portions, additional portions, or differently arranged portions than those depicted in FIG. 4. Additionally or alternatively, one or more portions of authentication message 104 may present data described as being included in one or more other portions of authentication message 104.

Figure 6:
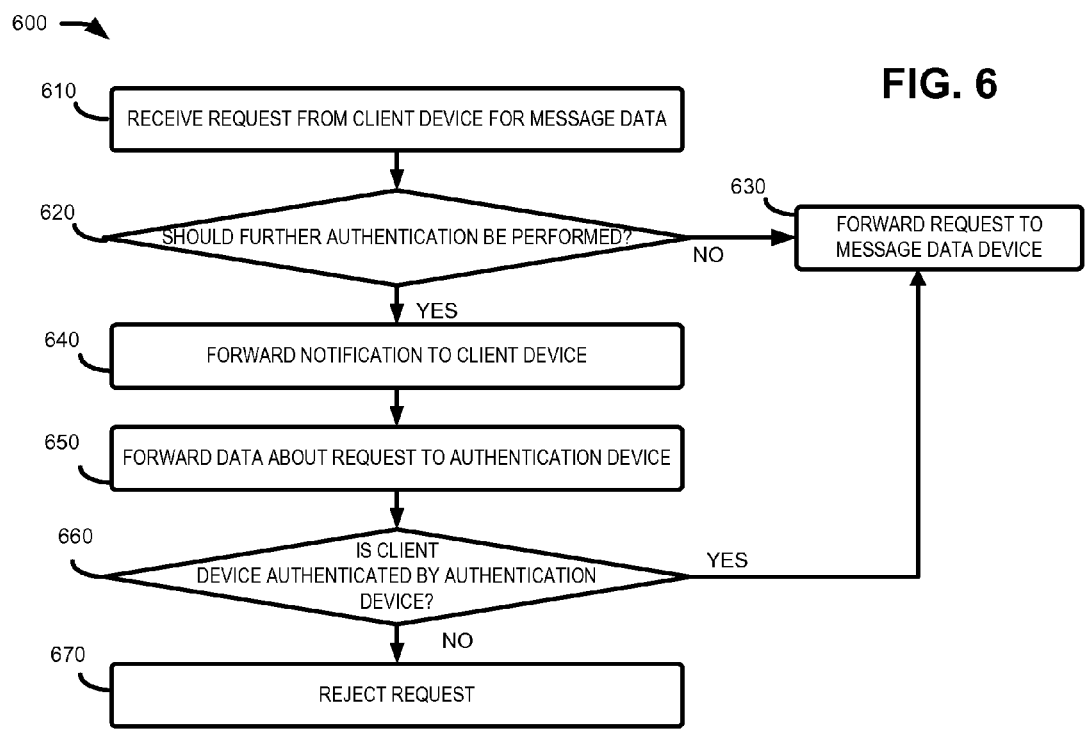
FIG. 6 shows an exemplary process for handling a request for message data through a proxy device included in the environment of FIG. 1.

FIG. 6 shows an exemplary process 600 for handling request 110 for message data 102 through proxy device 140. In some implementations, process 600 may be performed by proxy device 140. In other implementations, some or all of process 600 may be performed by another device or a group of devices separate from and/or including proxy device 140, such as client device 110 and/or authentication device 150.

As shown in FIG. 6, process 600 may include receiving request 101 from client device 110 for message data 102 ((block 720), and determining whether further steps for authentication should be performed (block 620). For example, proxy device 140 may receive, as request 101, POP3 or IMAP login data from client device 110, and proxy device 140 may evaluate contents of the login data. For example, proxy device 140 may determine whether request 101 is received from a known client device 110 (e.g., a client device 110 previously used to access message data 102) and/or a client device 110 associated with login information included in request 101. For example, proxy device 140 may identify a user associated with account login information included in request 101, and proxy device 140 may determine whether client device 110 is associated with the identified user. Proxy device 140 may perform additional steps for authentication if, for example, proxy device 140 determines that client device 110 is not known to be associated with the user (e.g., request 101 is sent from a public access computer).

In another example, proxy device 140 may determine whether client device 110 is located in a particular geographic location or country associated with the identified user. Proxy device 140 may perform additional authentication if, for example, proxy device 140 determines that client device 110 is located in a foreign country that is not associated with the user.

In yet another example, if proxy device 140 determines that request 101 includes correct account and/or password information, and proxy device 140 may request correct account and/or password information and may take additional steps for authentication. In another instance, proxy device 140 may determine whether more than a threshold number of requests 101 have been received from client device 101 (or a group of client devices 110 associated with a user) during a time period, and proxy device 140 may perform additional steps for authentication when more than the threshold quantity of requests 101 has been received from client device 110.

If proxy device 140 determines that further steps do not need to be performed (block 620—No), proxy device 140 may forward the request 101 to message data device 130 (block 630). For example, request 101 may be addressed to proxy device 140, and proxy device 140 may generate modified request 107 by replacing, in the data units, an IP address for proxy device 140 with a different IP address associated with message data device 130.

If proxy device 140 determines that further authentication should be performed (block 620—Yes), proxy device 140 may forward notification 108 to client device 110, and send an authentication request 103 to authentication device 150 (block 650). As described above, with respect to FIG. 4, notification 108 may include, for example, an indication that request is being initially delayed pending authentication of client device 110 by authentication device 150 and instructions to guide client device 110 through authentication. At block 650, proxy device 140 may include, in authentication request 103, data from request 101 (e.g., account and/or password data), information about client device 110 (e.g., a IP address), information about communications with client device 110 (e.g., network addresses associated with one or more intermediate nodes that carry request 101 between client device 110 and proxy device 140), etc.

As shown in FIG. 6, process 600 may further include determining whether client device 110 is authenticated by authentication device 150 (block 660). For example, proxy device 140 may receive authentication results 106, from authentication device 150, which indicates whether client device 110 provided requested authentication data 105 and whether authentication data 105 is correct. If client device 110 is authenticated by authentication device 150 (block 660—Yes), proxy device 140 may forward request 101 to message data device 130 (block 630). Otherwise, if client device 110 is not authenticated by authentication device 150 (block 660—No), proxy device 140 may reject request 101 (block 670). For example, proxy device 140 may send notification 108, to client device 110, which indicates that access to message data 101 is being denied.

FIG. 7 shows an exemplary process 700 for authenticating client device 110. In some implementations, process 700 may be performed by authentication device 150 based on receiving authentication request 103 (e.g., from proxy device 140 in block 650). In other implementations, some or all of process 700 may be performed by another device or a group of devices separate from and/or including authentication device 150, such as client device 110, message data device 130, and/or proxy device 140.

As shown in FIG. 7, process 700 may include receiving authentication request 103 from proxy device 140 (block 710) and collecting authentication data 105 related to client device 110 (block 720). For example, authentication device 150 may parse authentication request 103 to obtain information, such as a network address, associated with client device 110. Authentication device 150 may then use the information to send authentication message 104 to client device 110 to request authentication data 105. For example, as described above with respect to FIG. 5, authentication message 104 may cause client device 110 to prompt a user to input a password (e.g., a universal ID) or other authentication data such as biometric data. In another example, request 101 may be sent from a client device 110, and authentication device 150 may send authentication message 104 to a different client device 110 known to be associated with the user identified in request 101 (e.g., the user's smart phone). In this instance, authentication message 104 may cause client device 110 to ask the user to merely confirm that request 101 is legitimate (e.g., not being sent by another user and/or from a client device 110 not associated with the user). In another example, other types of authentication data 105 may be collected from other another device that differs from client device 110. For example, as described above with respect to FIG. 2, authentication device 150 may collect a client device identifier associated with client device 110 (e.g., data used by client device to access a portion of network 120) from a component of network 120.

As shown in FIG. 7, process 700 may further include determining whether client device 110 can be authenticated based on the collected authentication data 105 (block 730). For example, authentication device 150 may determine whether authentication data 105 is correct with respect to the user associated with the account identified in and/or password included in request 101. If authentication device 150 determines that client device 110 cannot be authenticated based on the collected authentication data 105 (block 730—No), authentication device 150 may send an indication (e.g., in authentication results 106), to proxy device 140, that client device 110 cannot be authenticated. Additionally or alternatively, authentication device 150 may forward another authentication message 104 to client device 110 to request replacement authentication data 105. If authentication device 150 determines that client device 110 can be authenticated based on the collected authentication data 105 (block 730—Yes), authentication device 150 may send an indication (e.g., in authentication results 106) to proxy device 140 that client device 110 passes authentication.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to processes 600 and 700 of FIGS. 6 and 7, the order of the blocks and/or signals in processes 600 and 700 may be modified in other implementations. For example, in one implementation, proxy server 140 may initiate authentication of proxy device 110 before request 101 is received (e.g., when client device 110 is initially activated or connects to network 120). Further, non-dependent blocks and/or signals in processes 600 and 700 may be performed in parallel.

Furthermore, it should be appreciated that although certain examples are provided herein with respect to proxy device 140 managing access to message data 101 at a message data device 130 implementing a messaging protocol, such as post office protocol (POP) or intern& message access protocol (IMAP), in other implementation proxy device 140 may manage access to other types of data, such authenticating a client device 110 requesting intern& data on a server implementing hypertext transfer protocol (HTTP) or database data on a server implementing structure query language (SQL).

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a processor associated with a proxy device, a request from a client device to access message data associated with a message account, wherein the message data is accessed through a message data device;
determining, by the processor, whether to perform authentication of the client device, wherein the client device is a first client device, and wherein determining whether to perform the authentication includes:
identifying, based on the request, a first geographic location associated with the client device,
identifying a second location associated with the message account,
determining whether the client device is associated with login information included in the request,
identifying a second client device associated with the message account, and
determining to perform the authentication when the first geographic location does not correspond to the second location, when the client device is not associated with the login information, or when the first client device does not correspond to the second client device;
forwarding, by the processor and based on determining to perform the authentication of the client device, data associated with the request to an authentication device, wherein the authentication device prompts a user of the message account to input a universal identifier, assigned by the authentication device, to access the message account, wherein the universal identifier enables the user to access multiple different services using different client devices, wherein the authentication device forwards a message to the second client device, wherein the message asks a user of the second client device to provide confirmation that the request is received from the user of the second client device, and wherein the authentication device determines to authenticate the first client device when the confirmation is received from the second client device;
receiving, by the processor and from the authentication device, results indicating whether the client device passed authentication; and
forwarding, by the processor and when the results indicate that the client device passed authentication, the request to the message data device, wherein the client device remains authenticated for a validity period when the results indicate that the client device passed authentication, and wherein a duration of the validity period varies based on the multiple different services.

2. The method of claim 1, further comprising: forwarding, based on determining to perform the authentication of the client device, a notification to the client device, wherein the notification indicates that the client device will be allowed to access the message data device if the client device is authenticated.

3. The method of claim 1, wherein the authentication device collects authentication data from the client device and determines whether to authenticate the client device based on the collected authentication data.

4. The method of claim 3, wherein the authentication data is the universal identifier associated with the user of the message account, wherein the universal identifier enables the user to access the multiple different services.

5. The method of claim 1, wherein the message data include e-mail messages, and wherein the message data device implements post office protocol (POP), internet message access protocol (IMAP), hypertext transfer protocol (HTTP), or structure query language (SQL) to enable access to the e-mail messages.

6. The method of claim 1, wherein determining whether to perform the authentication further includes:
determining to perform the authentication when more than a threshold number of requests associated with the message account are received during a time period.

7. A proxy device comprising:
a memory configured to store instructions; and
a processor configured to execute one or more of the instructions to:
receive a request from a client device to access message data associated with a message account, wherein the message data is accessed through a message data device;
determine whether to perform authentication of the client device, wherein the client device is a first client device, and wherein the processor, when determining whether to perform the authentication, is further configured to:
identify, based on the request, a first geographic location associated with the client device,
identify a second location associated with the message account,
determine whether the client device is associated with login information included in the request,
identify a second client device associated with the message account,
determine to perform the authentication when the first geographic location does not correspond to the second location, when the client device is not associated with the login information, or when the first client device does not correspond to the second client device;
forward, based on determining to perform the authentication of the client device, data associated with the request to an authentication device, wherein the authentication device prompts a user of the message account to input a universal identifier, assigned by the authentication device, to access the message account, wherein the universal identifier enables the user to access multiple different services using different client devices, wherein the authentication device forwards a message to the second client device, wherein the message asks for confirmation that the request is received from the user associated with the message account, and wherein the authentication device determines to authenticate the first client device when the confirmation is received from the second client device;
receive, from the authentication device, results indicating whether the client device passed authentication; and
forward, when the results indicate that the client device passed authentication, the request to the message data device, wherein the client device remains authenticated for a validity period when the results indicate that the client device passed authentication, and wherein a duration of the validity period varies based on the multiple different services.

8. The proxy device of claim 7, wherein the processor is further configured to:
forward, based on determining to perform the authentication of the client device, a notification to the client device, wherein the notification indicates that client device will be allowed to access the message data device if the client device is authenticated.

9. The proxy device of claim 7, wherein the authentication device collects authentication data from the client device and determines whether to authenticate the client device based on the collected authentication data.

10. The proxy device of claim 7, wherein the message data include e-mail messages, and wherein the message data device implements post office protocol (POP), internet message access protocol (IMAP), hypertext transfer protocol (HTTP), or structure query language (SQL) to enable access to the e-mail messages.

11. A non-transitory computer-readable medium to store instructions, wherein the instructions comprise:
one or more instructions that, when executed by a processor associated with a proxy device, cause the processor to:
receive a request from a client device to access message data associated with a message account, wherein the message data is accessed through a message data device;
determine whether to perform authentication of the client device, wherein the client device is a first client device, wherein the processor, when determining whether to perform the authentication, is further configured to:
identify, based on the request, a first geographic location associated with the client device,
identify a second location associated with the message account,
determine whether the client device is associated with login information included in the request,
identify a second client device associated with the message account, and
determine to perform the authentication when the first geographic location does not correspond to the second location, when the client device is not associated with the login information, or when the first client device does not correspond to the second client device;
forward, based on determining to perform the authentication of the client device, data associated with the request to an authentication device, wherein the authentication device prompts a user of the message account to input a universal identifier, assigned by the authentication device, to access the message account, wherein the universal identifier enables the user to access multiple different services using different client devices, wherein the authentication device forwards a message to the second client device, wherein the message asks for confirmation that the request is received from the user associated with the message account, and wherein the authentication device determines to authenticate the first client device when the confirmation is received from the second client device;
receive, from the authentication device, results indicating whether the client device passed authentication; and
forward, when the results indicate that the client device passed authentication, the request to the message data device, wherein the client device remains authenticated for a validity period when the results indicate that the client device passed authentication, and wherein a duration of the validity period varies based on the multiple different services.

12. The non-transitory computer-readable medium of claim 11, wherein one or more instructions further cause the processor to:
forward, based on determining to perform the authentication of the client device, a notification to the client device, wherein the notification indicates that client device will be allowed to access the message data device if the client device is authenticated.

13. The non-transitory computer-readable medium of claim 11, wherein the authentication device collects authentication data from the client device and determines whether to authenticate the client device based on the collected authentication data.

14. The non-transitory computer-readable medium of claim 11, wherein the message data include e-mail messages, and wherein the message data device implements post office protocol (POP), internet message access protocol (IMAP), hypertext transfer protocol (HTTP), or structure query language (SQL) to enable access to the e-mail messages to enable access to the e-mail messages.

* * * * *